(12) United States Patent
Kwon

(10) Patent No.: US 10,041,711 B2
(45) Date of Patent: Aug. 7, 2018

(54) SUPERCONDUCTING ROTATING MACHINE AND COOLING METHOD THEREOF

(71) Applicant: DOOSAN HEAVY INDUSTRIES & CONSTRUCTION CO., LTD., Changwon-Si (KR)

(72) Inventor: Woon Sik Kwon, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 1324 days.

(21) Appl. No.: 14/120,265

(22) Filed: May 14, 2014

(65) Prior Publication Data

US 2014/0378310 A1 Dec. 25, 2014

(30) Foreign Application Priority Data

May 14, 2013 (KR) .................. 10-2013-0054315

(51) Int. Cl.
| | |
|---|---|
| F25B 25/00 | (2006.01) |
| F25D 19/00 | (2006.01) |
| F25B 39/04 | (2006.01) |
| H02K 55/04 | (2006.01) |
| F28D 15/02 | (2006.01) |

(Continued)

(52) U.S. Cl.
CPC .......... *F25B 39/04* (2013.01); *F28D 15/0266* (2013.01); *F28D 15/06* (2013.01); *H02K 55/04* (2013.01); *F25B 23/006* (2013.01); *F25B 25/005* (2013.01); *F25B 2400/17* (2013.01); *F25D 19/00* (2013.01); *Y02E 40/625* (2013.01)

(58) Field of Classification Search
CPC ..... F25D 19/00; F25D 15/0266; H02K 9/005; H02K 9/20; H02K 55/00
See application file for complete search history.

(56) References Cited

U.S. PATENT DOCUMENTS

| | | | | |
|---|---|---|---|---|
| 3,755,702 A | * | 8/1973 | Willyoung | ............. H02K 9/005 310/53 |
| 4,365,479 A | * | 12/1982 | Weghaupt | ............. H02K 9/193 310/61 |
| 2007/0095075 A1 | * | 5/2007 | Frank | .................. F28D 15/0266 62/48.2 |

FOREIGN PATENT DOCUMENTS

| | | |
|---|---|---|
| WO | 2012/038357 A1 | 3/2012 |
| WO | 2012/116911 A1 | 9/2012 |

* cited by examiner

*Primary Examiner* — Elizabeth Martin
*Assistant Examiner* — Zachary R Anderegg
(74) *Attorney, Agent, or Firm* — Sughrue Mion, PLLC

(57) ABSTRACT

Provided are a superconducting rotating machine which improves the cooling efficiency of a rotor by using schemes of passively or actively circulating a coolant and a cooling method thereof. The superconducting rotating machine includes a rotor supported rotatably about a rotation axis and including: at least one superconductive coil; and a central cavity; and a cooling apparatus disposed at an exterior of the rotor and configured to communicate with the cavity, wherein the cooling apparatus includes: a condenser configured to condense a gas coolant supplied through a gas coolant supplying pipe to generate a condensed coolant; a coolant circulating unit configured to supply the condensed coolant into the cavity, configured to recover a vapor coolant evaporated in the cavity into the condenser and configured to circulate the condensed coolant; and a forced circulating unit configured to actively circulate the condensed coolant into the cavity in response to the rotor being tilted.

11 Claims, 4 Drawing Sheets

(51) Int. Cl.
*F28D 15/06* (2006.01)
*F25B 23/00* (2006.01)

SUPERCONDUCTING ROTATING MACHINE AND COOLING METHOD THEREOF

CROSS-REFERENCE TO RELATED APPLICATION

This application claims priority from Korean Patent Application No. 10-2013-0054315, filed on May 14, 2013, in the Korean Intellectual Property Office, the disclosure of which is incorporated herein by reference in its entirety.

BACKGROUND

Apparatuses and methods consistent with exemplary embodiments relate to a superconducting rotating machine and a cooling method thereof, and more particularly, to a superconducting rotating machine in which a coolant for cooling a rotor having a superconductive coil is enabled to circulate naturally and compulsively, and a cooling method thereof.

A superconducting rotating machine includes a superconductive coil which must be cooled during the operation of the superconducting rotating machine. A metallic oxide superconductive material having the transition temperature higher than 77K is generally known in the art. A machine including a superconductive coil containing such a material may be cooled, for example, by liquid nitrogen.

A technique of cooling a rotor of a superconducting rotating machine is known in the related art.

The rotor includes a thermal conductive rotor body, and a superconductive coil made of a superconductive material and installed to a coil supporter.

The rotor body has a central cavity extending in an axial direction and having a cylindrical shape, in which coolant line members drawn out from the coil supporter are connected to a side surface of the central cavity. The line members extends to a condenser chamber of a cooling apparatus geodetically located at a higher position, so that the line members form a closed single-tube line system together with the condenser chamber and the central cavity.

The coolant is circulated in the line system due to the thermosiphon effect. The coolant condensed in the condenser chamber flows into the central cavity through the coolant line members. The coolant in the central cavity is thermally coupled to the superconductive coil as well as the coil supporter, so that the coolant is evaporated by absorbing heat. Then, the evaporated coolant fluid again arrives at the condenser chamber through the same line members, and then, the coolant is again condensed in the condenser chamber.

When cooling is performed by the thermosiphon effect, since the conveyance of the liquid coolant is enabled under the gravity, the cooling apparatus or the condenser chamber must be placed at a position higher than that of the coil supporter.

In addition, when the cooling is performed by the thermosiphon effect, since the rotor is cooled using a natural circulation of the coolant, the initial cooling time is too long.

SUMMARY

One or more exemplary embodiments provide a superconducting rotating machine which can improve the cooling efficiency of a rotor by using schemes of passively or actively circulating a coolant and a cooling method thereof.

Further, one or more exemplary embodiments provide a superconducting rotating machine which is configured to actively supply an external liquid coolant when a rotor of the superconducting rotating machine is initially cooled, and a cooling method thereof.

According to an aspect of an exemplary embodiment, there is provided a superconducting rotating machine including a rotor supported rotatably about a rotation axis and including: at least one superconductive coil; and a central cavity; and a cooling apparatus disposed at an exterior of the rotor and configured to communicate with the cavity, wherein the cooling apparatus includes: a condenser configured to condense a gas coolant supplied through a gas coolant supplying pipe to generate a condensed coolant; a coolant circulating unit configured to supply the condensed coolant into the cavity, configured to recover a vapor coolant evaporated in the cavity into the condenser and configured to circulate the condensed coolant; and a forced circulating unit configured to actively circulate the condensed coolant into the cavity in response to the rotor being tilted.

The coolant circulating unit may include: at least one internal coolant supplying line configured to supply the condensed coolant into the cavity; and at least one coolant recovery line configured to recover the vapor coolant into the condenser.

The forced circulating unit may include a pump connected between the condenser and the internal coolant supplying line, the pump configured to actively supply the condensed coolant of the condenser into the cavity through the internal coolant supplying line.

The superconducting rotating machine may further include an external liquid coolant supplying unit configured to actively supply an external liquid coolant into the cavity.

The external liquid coolant supplying unit may include: at least one external coolant supplying line configured to supply the external liquid coolant into the cavity; and a connecting line connecting the pump to the external coolant supplying line.

The superconducting rotating machine may further include a check valve provided at the connecting line and configured to induce the external liquid coolant to flow in one direction through the external coolant supplying line.

The internal coolant supplying line, the coolant recovery line and the external coolant supplying line may be concentrically disposed about the rotation axis.

The superconducting rotating machine may further include: a first connecting line vacuum part configured to enclose the internal coolant supplying line, the coolant recovery line and the external coolant supplying line; a second connecting line vacuum part connected to the rotor to surround the first connecting line vacuum part; and a mechanical seal provided between the first and second connecting line vacuum parts.

The superconducting rotating machine may further include: a tilt sensor configured to sense a tilt of the rotor; and a control unit configured to output a driving signal configured to drive the pump in response to the control unit receiving a tilt signal from the tilt sensor.

The superconducting rotating machine may further an initial cooling state sensor configured to determine whether the external liquid coolant is supplied through the external coolant supplying line so that a temperature of the rotor reaches an initial cooling temperature, wherein the control unit may be configured to stop driving the pump and configured to output a signal to supply a gas coolant through the gas coolant supplying line in response to the temperature of the rotor reaching the initial cooling temperature.

The initial cooling state sensor comprises at least one of a time counter configured to count an initial coolant circulating time, a temperature measuring sensor configured to measure the temperature of the rotor, and a rotation number sensor configured to check a number of rotations of the rotor.

The superconducting rotating machine may further include a vacuum housing enclosing the condenser and the pump.

According to an aspect of an exemplary embodiment, there is provided a method of cooling a superconducting rotating machine, the method including: passively circulating a coolant in a thermosiphon scheme to recover a vapor coolant into a condenser through at least one coolant recovery line, wherein the vapor coolant is generated by evaporating a condensed coolant supplied into a cavity of a rotor through at least one internal supplying line by gravity, and the condensed coolant is generated by condensing a gas coolant through the condenser of a cooling apparatus; determining whether the rotor is tilted; and actively circulating the condensed coolant to supply the condensed coolant in response to determining that the rotor is tilted.

The actively circulating the condensed coolant may be performed through a pumping force of a pump provided between the internal coolant supplying line and the condenser.

The actively circulating of the condensed coolant may include: determining whether the rotor is tilted while the passively circulating the condensed coolant is performed; and driving the pump in response the rotor being tilted.

The method may further include initially cooling the rotor by actively supplying an external liquid coolant into the cavity of the rotor before performing the passively circulating the condensed coolant.

The initial cooling of the rotor may include: actively supplying the external liquid coolant through at least one external coolant supplying line; determining whether a temperature of the rotor reaches at an initial cooling temperature by an initial cooling state sensor; and supplying the gas coolant to a cooling unit after stopping the supplying the external liquid coolant in response to the temperature of the rotor reaching the initial cooling temperature.

The condensed coolant and the external liquid coolant may be actively supplied by a single pump.

A check valve may be configured to prevent the external liquid coolant from flowing reversely while the external liquid coolant is being supplied through the external coolant supplying line.

The determining the temperature of the rotor may include at least one of counting an initial coolant circulating time, sensing the rotor temperature and checking a number of rotations of the rotor.

BRIEF DESCRIPTION OF THE DRAWINGS

The above and/or other aspects of the disclosure will become apparent and more readily appreciated from the following description of exemplary embodiments, taken in conjunction with the accompanying drawings in which.

DETAILED DESCRIPTION

Hereinafter, exemplary embodiments will be described in more detail with reference to accompanying drawings. The present inventive concept is not limited to the following the exemplary embodiments but includes various applications and modifications. The exemplary embodiments will allow those skilled in the art to completely comprehend the scope of the present inventive concept.

Figure 1:
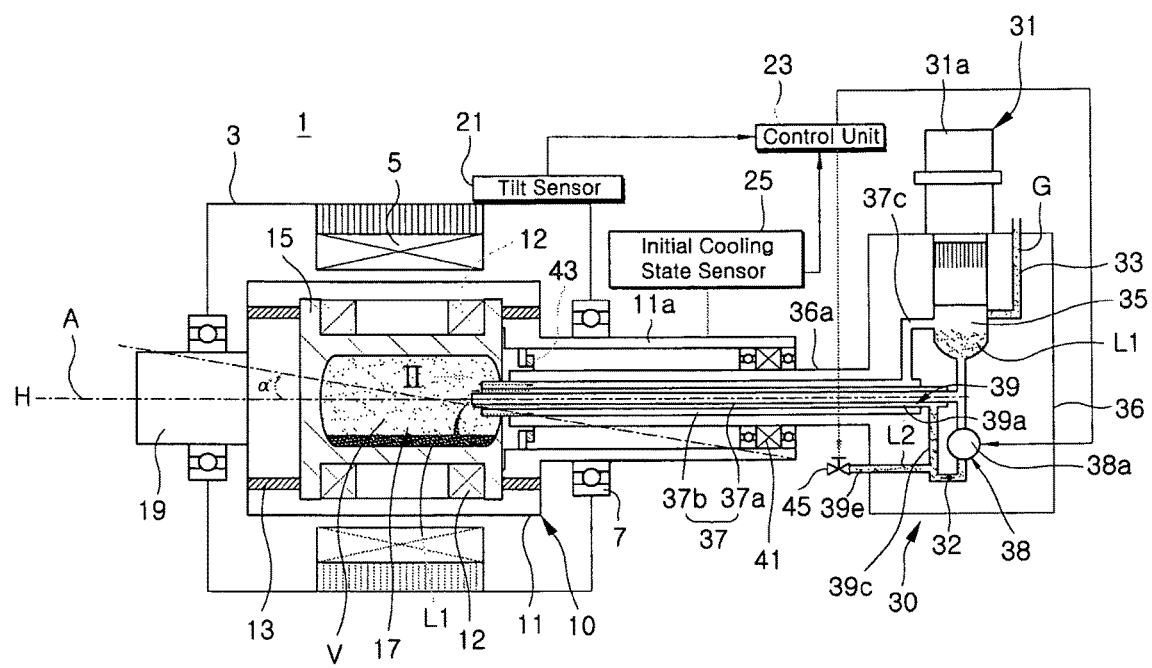
FIG. 1 is a view showing an entire configuration of a superconducting rotating machine according to an exemplary embodiment.

FIG. 1 is a view showing a configuration of a superconducting rotating machine according to an exemplary embodiment.

Referring to FIG. 1, the superconducting rotating machine 1 includes an outer housing 3, a stator coil 5 installed in the outer housing 3, and a rotor 10 placed in the outer housing 3 and surrounded with the stator coil 5.

The rotor 10 includes a vacuum housing 11 rotatably supported based on a rotation axis A by a bearing 7 in the outer housing 3, and a coil supporter 15 having a superconductive coil 12 and supported in the vacuum housing 11, for example, by a hollow cylindrical torque transferring supporting member 13.

The coil supporter 15 includes a central cavity 17 disposed concentrically with the rotation axis A and extending along the rotation axis A. The cavity 17 may have a cylindrical shape. The cavity 17 is maintained in a vacuum state by the coil supporter 15. One side of the rotor 10 is supported in the outer housing 3 by a rotational shaft 19.

For example, a cooling apparatus 30 may be provided at an outside of the rotor 10 while being spaced apart from the rotor 10 by several meters.

The cooling apparatus 30 includes a cooler 31 for indirectly cooling the superconductive coil 12 through a thermal conductive member. A cold head 31a of the cooler 31 is only depicted in the drawings. The cooler 31 may be formed in a Gifford-McMahon type, a Stirling type or a pulse-tube type.

The cooling apparatus 30 may include a condenser 35 which is thermally coupled to the thermal conductive member (not shown) coupled to the cold head 31a to condense a gas coolant G supplied through a gas coolant supplying line 33, and a coolant circulating unit 37 which connects the cavity and the condenser 35 to each other.

The coolant circulating unit 37 allows the coolant L1 condensed in the condenser 35 to flow into the cavity 17. The condensed coolant L1 is thermally coupled to the superconductive coil 12 as well as the coil supporter 15 in the cavity 17, so that the condensed coolant absorbs heat to evaporate, and then, the evaporated coolant V returns to the condenser 35.

The coolant circulating unit 37 includes at least one internal coolant supplying line 37a for supplying the condensed coolant L1 from the condenser 35 into the cavity 17 and at least one coolant recovery line 37b for drawing back the evaporated coolant V evaporated in the cavity 17 into the condenser 35, so that the coolant may be circulated by thermosiphon effect.

A connecting line 37c may be further provided between the coolant recovery line 37b and the condenser 35.

In this case, the internal coolant supplying line 37a and the coolant recovering line 37b may be prepared as the same line, such that the condensed coolant L1 and the evaporated coolant V may be circulated through the same line.

The cooling apparatus 30 may include a forced circulating unit 38 for actively supplying the condensed coolant L1 into the cavity 17 when the rotor 10 is tilted.

The tilting of the rotor 10 corresponds to an unbalance state of the superconducting rotating machine 1, that is, the tilting of the rotor 10 occurs when the superconducting rotating machine 1 is inclined from a horizontal state H at a predetermined angle ($\alpha°$) or more when the superconducting rotating machine 1 is employed in a ship or coastal equipment. In other words, the tilting of the rotor corresponds to a state where the condenser 35 is placed at a position lower than that of the cavity 17 in the gravity direction.

Further, the tilting of the rotor 10 means that there may be a problem in the flow of the condensed coolant from the condenser 35 to the cavity 17.

The forced circulating unit 38 may include a pump 38a connected between the condenser 35 and the internal coolant supplying line 37a to actively supply the condensed coolant L1 supplied from the condenser 35 into the cavity 17 through the internal coolant supplying line 37a. In other words, the pump 38a moves the condensed coolant L1 supplied from the condenser 35 into the cavity 17 through pumping action.

The superconducting rotating machine 1 may further include a tilt sensor 21 in order to determine whether the rotor 10 is tilted. For example, the tilt sensor 21 may adhere to an upper portion of the outer housing 3. However, the exemplary embodiment is not limited thereto.

The superconducting rotating machine 1 may include a control unit 23 which outputs a driving signal to drive the pump 38a when the superconducting rotating machine 1 receives a tilt signal indicating that the superconducting rotating machine 1 is tilted from the tilt sensor 21.

The cooling apparatus 30 may further include an external liquid supplying unit 39 for actively supplying or moving an external liquid coolant when the rotor 10 is initially cooled.

The external liquid supplying unit 39 may include at least one external coolant supplying line 39a and a pump to supply an external liquid coolant L2 into the cavity 17. The pump the same as the pump 38a employed in the forced circulating unit 38 may be used. That is, the pump 38a may supply the condensed coolant L1 from the condenser 35 and the external liquid coolant L2 supplied through the external coolant supplying line 39a into the cavity 17 via pumping the condensed coolant L1 and the external liquid coolant L2.

A connecting line 39c may be provided between the external coolant supplying line 39a and the pump 38a. The connecting line 39c may be connected to a main supplying pipe 39e for supplying the external liquid coolant L2.

A control valve 45 may be provided to the main supplying pipe 39e to be enabled to be opened or closed, such that the control valve 45 may control the supplying or blocking of the external liquid coolant L2.

The external liquid coolant L2 may include an extremely low temperature liquid coolant such as liquid nitrogen.

A check valve 32 may be provided to the connecting line 39c, such that, when the external liquid coolant L2 is supplied by the pump 38a through the external supplying line 39a, the external liquid coolant L2 is induced to flow through the connecting line 39c along the external supplying line 39a in a single direction and is prevented from flowing in the reverse direction.

The external liquid supplying unit 39 may further include an initial cooling state sensor 25 for sensing whether the external liquid coolant L2 is supplied through the external coolant supplying line 39a so that the rotor 10 is cooled at the initial cooling temperature.

The initial cooling state sensor 25 may include a counter for counting an initial coolant circulating time taken for the external liquid coolant L2 to be circulated, a temperature sensor for sensing the temperature of the rotor 10, and a rotation sensor for checking the rotation number of the rotor 10.

When the control unit 23 determines that the temperature of the rotor 10 reaches the initial cooling temperature based on the signal transferred from the initial cooling state sensor 25, the control unit 23 may stop driving the pump 38a and may output a signal by which the gas coolant G is enabled to be supplied through the gas supplying line 33.

The gas coolant may include at least one of neon, hydrogen and helium.

The condenser 35 and the pump 38a are surrounded by the vacuum housing 36 of the cooling apparatus to be heat-insulated from an outside.

A first connecting line vacuum part 36a, which surrounds the internal coolant supplying line 37a, the coolant recovery line 37b and the external coolant supplying line 39a to be heat-insulated from an outside, may be provided to a portion of the vacuum housing 36.

A second connecting line vacuum part 11a, which surrounds the first connecting line vacuum part 36a to be heat-insulated, may be provided to a portion of the vacuum housing 11.

A magnetic liquid seal 41 may be provided near the vacuum housing 36 of the cooling apparatus between the first and second connecting line vacuum parts 36a and 11a and a mechanical seal 43 may be further provided opposite to the magnetic liquid seal 41 between the first and second connecting line vacuum parts 36a and 11a.

The magnetic liquid seal 41 and the mechanical seal are spaced apart from each other by a predetermined interval, so that the coolant is doubly prevented from being leaked. Specifically, the mechanical seal 43 may primarily prevent the coolant from being leaked, so that the magnetic liquid seal 41 may be prevented from being corroded by the coolant.

Figure 2:
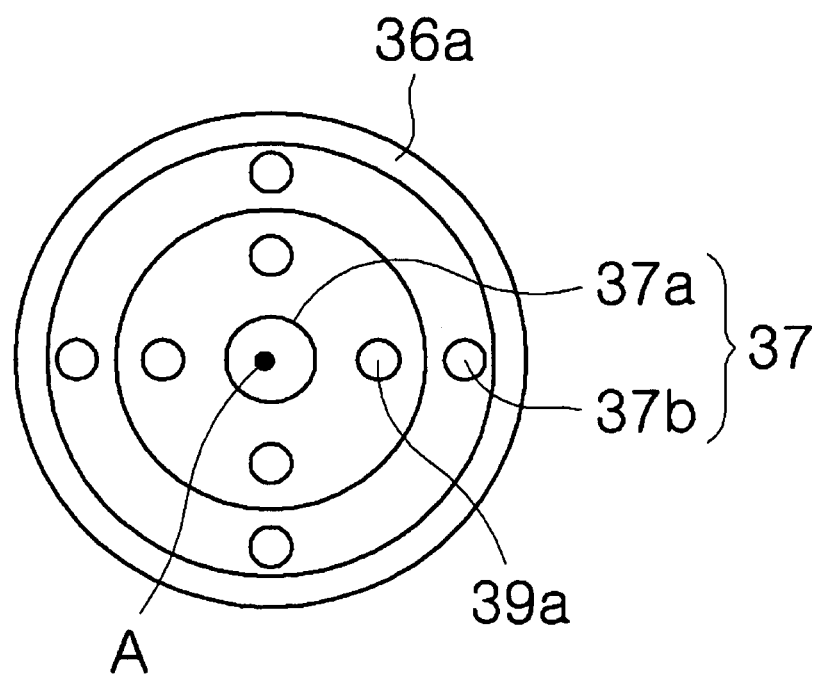
FIG. 2 is a view of the superconducting rotating machine when seen in the direction of arrow II of FIG. 1 according to an exemplary embodiment.

FIG. 2 is a view of the superconducting rotating machine when seen in the direction of arrow II of FIG. 1 according to an exemplary embodiment.

Referring to FIG. 2, the internal coolant supply line 37a, the coolant recovery line 37b and the external coolant supplying line 39a are concentrically disposed about the rotation axis A.

At least one internal coolant supplying line 37a may be provided and may be disposed to allow the center to be on the rotation axis A.

At least one coolant recovery line 37b may be provided at a predetermined interval in a circumferential direction about the inner coolant supplying line 37a.

The external coolant supplying line 39a may be disposed between the coolant supplying line 37a and the coolant recovery line 37b and aligned in a circumferential direction at a predetermined interval.

Hereinafter, a method of cooling a superconducting rotating machine according to an exemplary embodiment will be described.

Figure 3:
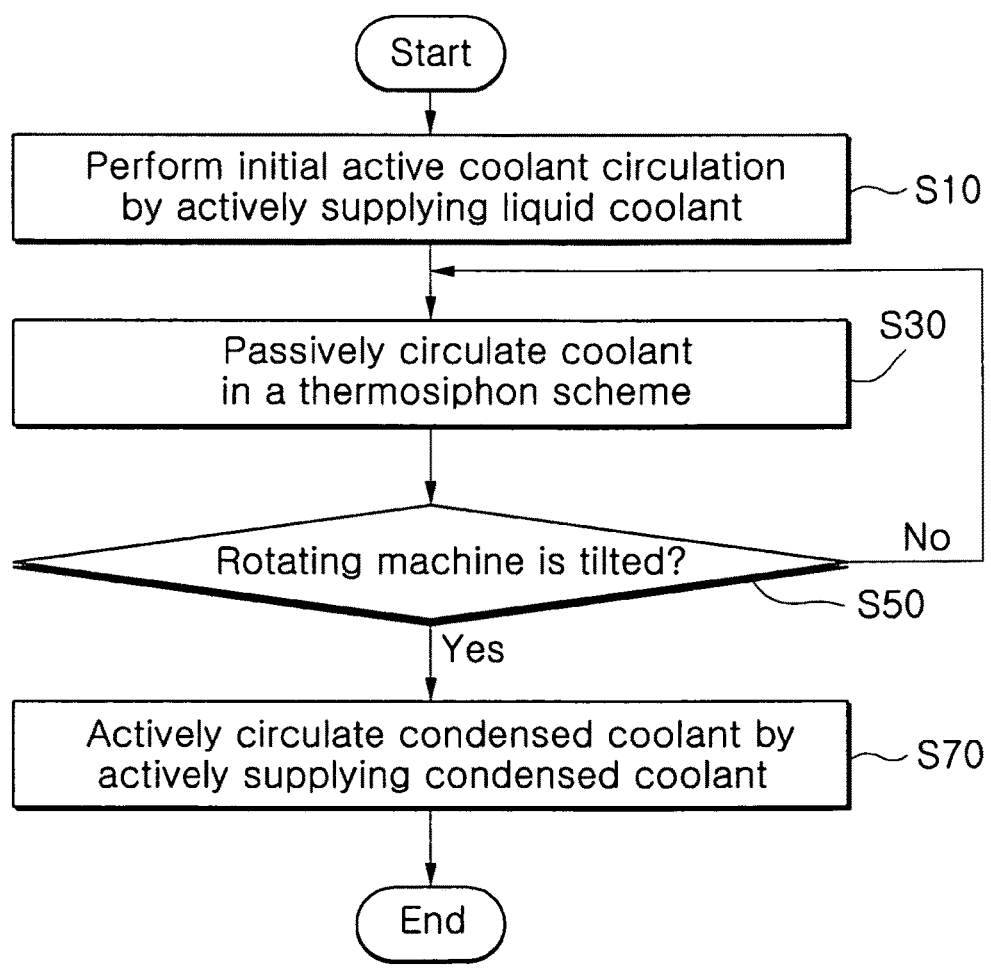
FIG. 3 is a flowchart illustrating a method of cooling a superconducting rotating machine according to an exemplary embodiment.

FIG. 3 is a flowchart illustrating a method of cooling a superconducting rotating machine according to an exemplary embodiment.

Referring to FIGS. 1 and 3, the method of cooling a superconducting rotating machine may include a passive coolant circulating step S30, a rotor tilt determining step S50, and an active condensed coolant circulating step S70.

In the passive coolant circulating step S30, the gas coolant G supplied through the gas coolant supplying line 33 is condensed by the condenser 35. The condensed coolant L1 by the condenser 35 is supplied into the cavity 17 of the rotor 10 through the internal coolant supplying line 37a by gravity.

The condensed coolant L1 supplied into the cavity 17 is evaporated. The coolant V evaporated in a vapor type by absorbing heat flows into the condenser 35 through the coolant recovery line 37b. The coolant circulation is achieved under the condition of using so-called "thermosiphon effect."

In the rotor tilt determining step S50, the tilt sensor 23 senses a tilt of the rotor 10.

Based on the signal received through the tilt sensor 23, the control unit 23 determines whether the rotor 10 is tilted and then, determines whether the rotor 10 is tilted at a predetermined angle ($\alpha°$) or more, so that it is impossible to supply the liquid coolant L1 into the cavity 17 by gravity.

As described above, when it is determined in the rotor tilt determining step S50 that the rotor is tilted, the control unit 23 outputs the pump driving signal to drive the pump 38a.

Thus, the liquid coolant L1 received in the condenser 35 is actively supplied into the cavity 17 by the driving force of the pump 38a. The liquid coolant L1 supplied into the cavity 17 is evaporated by absorbing heat and the vapor coolant V flows into the condenser 35 through the coolant recovery line 37b.

In addition, an initial coolant circulating step S10 for actively circulating the external liquid coolant L2 before performing the natural coolant circulating step S30 may be further included.

Figure 4:
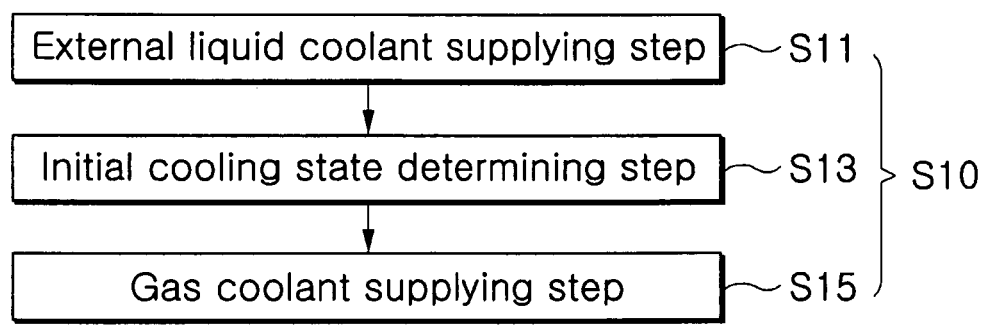
FIG. 4 is a flowchart illustrating an initial coolant circulating step of FIG. 3 according to an exemplary embodiment.

FIG. 4 is a flowchart illustrating details of the initial coolant circulating step S10 of FIG. 3 according to an exemplary embodiment.

Referring to FIGS. 1 and 4, the initial coolant circulating step S10 includes an external liquid coolant supplying step S11, an initial cooling state determining step S13 and a gas coolant supplying step S15.

In the external liquid coolant supplying step S11, the pump 38a is driven and the control valve 45 is opened so that the external liquid coolant L2, which is liquid nitrogen, is supplied through the main supplying pipe 39e. In this case, the control valve 45 is opened according to the signal output from the control unit 23.

The external liquid coolant L2 is supplied into the cavity 17 through the connecting line 39c and the external liquid coolant supplying line 39a.

The external liquid coolant L2 supplied into the cavity 17 absorbs heat to evaporate into a vapor state and then, the evaporated coolant flows into the condenser 35 through the coolant recovery line 37b, so that the evaporated coolant is re-condensed. The re-condensed coolant L1 is supplied into the cavity 17 through the internal coolant supplying line 37a.

While the external liquid coolant L2 is actively pumped by the pumping force of the pump 38a, the external liquid coolant L2 is induced to flow in one direction by the check valve 32 provided in the connecting line 39c, so that the external liquid coolant L2 flows along the external liquid coolant supplying line 39a through the connecting line 39c and is prevented from flowing in the reverse direction.

Thus, as the external liquid coolant L2 is compulsively supplied into the cavity 17 by the driving force of the pump 38a, the initial cooling time of the rotor 10 may be reduced.

It is described above that the driving force for circulating the external liquid coolant L2 is provided by the pump 38a which actively pumps the condensed coolant L1, but it is understood that another pump may be used instead of the pump 38a.

In the initial cooling state determining step S13, the external liquid coolant L2 is supplied into the cavity 17 to evaporate and then, the initial cooling state of the rotor 10 is sensed through the initial cooling state sensor 25 while an initial coolant circulation operation, in which the vapor coolant is recovered into the condenser 35 to be re-condensed and the re-condensed coolant L1 is supplied into the cavity 17, is performed.

The sensing of the initial cooling state may be performed by counting an initial coolant circulating time, sensing the temperature of the rotor 10 or checking the rotation number of the rotor 10.

In the gas coolant supplying step S15, the control unit 23 determines whether the temperature of the rotor 10 reaches the desired initial cooling temperature based on the date received through the initial coolant state sensor 25.

When it is determined that the temperature of the rotor 10 reaches the desired initial cooling temperature, the control unit 23 outputs the driving signal to stop driving the pump 38a and then, allows the gas coolant G including at least one of neon, hydrogen and helium to be supplied through the gas coolant supplying line 33.

Thus, when the rotor 10 is initially cooled through liquid nitrogen, after the gas coolant G is supplied through the gas coolant supplying line 33 and condensed through the condenser 35, the coolant is supplied into the cavity 17 by gravity so that the rotor 10 is cooled at the target temperature.

According to the exemplary embodiment of the present invention, it is configured in a natural circulation scheme or a compulsive circulation scheme to enable the coolant to be circulated, so that the coolant can be smoothly circulated even in state that the rotor is in a non-level state (i.e. not in a horizontal state).

According to the exemplary embodiment, the superconducting rotating machine is configured to actively circulate liquid nitrogen in the initial cooling of the rotating machine, so that the initial cooling time of the superconducting rotating machine can be reduced.

While exemplary embodiments have been particularly described above, it will be understood by those skilled in the art that various modifications, additions and substitutions in form and details may be made therein without departing from the scope and spirit of the inventive concept as defined by the following claims.

What is claimed is:

1. A superconducting rotating machine comprising:
   a rotor supported rotatably about a rotation axis and comprising:
     at least one superconductive coil; and
     a central cavity;
   a cooling apparatus disposed at an exterior of the rotor and configured to communicate with the cavity; and
   an external liquid coolant supplying unit configured to actively supply an external liquid coolant into the cavity, the external liquid coolant supplying unit comprising a plurality of external coolant supplying lines configured to supply the external liquid coolant into the cavity,
   wherein the cooling apparatus comprises:
     a condenser configured to condense a gas coolant supplied through a gas coolant supplying pipe to generate a condensed coolant;

a coolant circulating unit configured to supply the condensed coolant into the cavity, configured to recover a vapor coolant evaporated in the cavity into the condenser and configured to circulate the condensed coolant; and
a forced circulating unit configured to actively circulate the condensed coolant into the cavity in response to the rotor being tilted, and
wherein the plurality of external coolant supplying lines configured to supply the external liquid coolant into the cavity are concentrically disposed about the rotation axis.

2. The superconducting rotating machine of claim 1, wherein the coolant circulating unit comprises:
at least one internal coolant supplying line configured to supply the condensed coolant into the cavity; and
at least one coolant recovery line configured to recover the vapor coolant into the condenser.

3. The superconducting rotating machine of claim 2, wherein the forced circulating unit comprises a pump connected between the condenser and the internal coolant supplying line, the pump configured to actively supply the condensed coolant of the condenser into the cavity through the internal coolant supplying line.

4. The superconducting rotating machine of claim 2, wherein the external liquid coolant supplying unit comprises
a connecting line connecting the pump to the external coolant supplying lines.

5. The superconducting rotating machine of claim 4, further comprising a check valve provided at the connecting line and configured to induce the external liquid coolant to flow in one direction through the external coolant supplying lines.

6. The superconducting rotating machine of claim 4, further comprising:
a tilt sensor configured to sense a tilt of the rotor; and
a control unit configured to output a driving signal configured to drive the pump in response to the control unit receiving a tilt signal from the tilt sensor.

7. The superconducting rotating machine of claim 4, further comprising a vacuum housing enclosing the condenser and the pump.

8. A superconducting rotating machine comprising:
a rotor supported rotatably about a rotation axis and comprising:
at least one superconductive coil; and
a central cavity;
a cooling apparatus disposed at an exterior of the rotor and configured to communicate with the cavity; and
an external liquid coolant supplying unit configured to actively supply an external liquid coolant into the cavity,
wherein the cooling apparatus comprises:
a condenser configured to condense a gas coolant supplied through a gas coolant supplying pipe to generate a condensed coolant;
a coolant circulating unit configured to supply the condensed coolant into the cavity, configured to recover a vapor coolant evaporated in the cavity into the condenser and configured to circulate the condensed coolant; and
a forced circulating unit configured to actively circulate the condensed coolant into the cavity in response to the rotor being tilted,
wherein the coolant circulating unit comprises:
at least one internal coolant supplying line configured to supply the condensed coolant into the cavity; and
at least one coolant recovery line configured to recover the vapor coolant into the condenser,
wherein the forced circulating unit comprises a pump connected between the condenser and the internal coolant supplying line, the pump configured to actively supply the condensed coolant of the condenser into the cavity through the internal coolant supplying line,
wherein the external liquid coolant supplying unit comprises:
at least one external coolant supplying line configured to supply the external liquid coolant into the cavity; and
a connecting line connecting the pump to the external coolant supplying line, and
wherein the internal coolant supplying line, the coolant recovery line and the external coolant supplying line are concentrically disposed about the rotation axis.

9. The superconducting rotating machine of claim 8, further comprising:
a first connecting line vacuum part configured to enclose the internal coolant supplying line, the coolant recovery line and the external coolant supplying line;
a second connecting line vacuum part connected to the rotor to surround the first connecting line vacuum part; and
a mechanical seal provided between the first and second connecting line vacuum parts.

10. A superconducting rotating machine comprising:
a rotor supported rotatably about a rotation axis and comprising:
at least one superconductive coil; and
a central cavity;
a cooling apparatus disposed at an exterior of the rotor and configured to communicate with the cavity;
an external liquid coolant supplying unit configured to actively supply an external liquid coolant into the cavity;
an initial cooling state sensor configured to determine whether the external liquid coolant is supplied through the external coolant supplying line so that a temperature of the rotor reaches an initial cooling temperature;
a tilt sensor configured to sense a tilt of the rotor; and
a control unit configured to output a driving signal configured to drive the pump in response to the control unit receiving a tilt signal from the tilt sensor,
wherein the cooling apparatus comprises:
a condenser configured to condense a gas coolant supplied through a gas coolant supplying pipe to generate a condensed coolant;
a coolant circulating unit configured to supply the condensed coolant into the cavity, configured to recover a vapor coolant evaporated in the cavity into the condenser and configured to circulate the condensed coolant; and
a forced circulating unit configured to actively circulate the condensed coolant into the cavity in response to the rotor being tilted,
wherein the coolant circulating unit comprises:
at least one internal coolant supplying line configured to supply the condensed coolant into the cavity; and
at least one coolant recovery line configured to recover the vapor coolant into the condenser,
wherein the forced circulating unit comprises a pump connected between the condenser and the internal coolant supplying line, the pump configured to actively supply the condensed coolant of the condenser into the cavity through the internal coolant supplying line, wherein the external liquid coolant supplying unit comprises:
　　at least one external coolant supplying line configured to supply the external liquid coolant into the cavity; and
　　a connecting line connecting the pump to the external coolant supplying line, and
wherein the control unit is configured to stop driving the pump and configured to output a signal to supply a gas coolant through the gas coolant supplying line in response to the temperature of the rotor reaching the initial cooling temperature.

11. The superconducting rotating machine of claim 10, wherein the initial cooling state sensor comprises at least one of a time counter configured to count an initial coolant circulating time, a temperature measuring sensor configured to measure the temperature of the rotor, and a rotation number sensor configured to check a number of rotations of the rotor.

* * * * *